March 14, 1967  F. F. HOLUB  3,309,334
POLYMERIC COPOLYESTERS OF PHTHALIC
ACIDS, A BIS-(HYDROXYPHENYL)
ALKANE AND A DIPHENOLIC ACID
Filed July 12, 1963
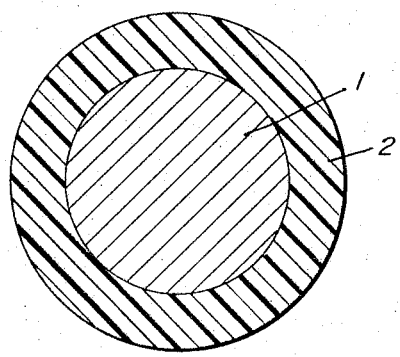
Inventor:
Fred F. Holub,
by [signature]
His Agent

United States Patent Office 3,309,334
Patented Mar. 14, 1967

---

3,309,334
POLYMERIC COPOLYESTERS OF PHTHALIC ACIDS, A BIS-(HYDROXYPHENYL)ALKANE AND A DIPHENOLIC ACID
Fred F. Holub, Scotia, N.Y., assignor to General Electric Company, a corporation of New York
Filed July 12, 1963, Ser. No. 294,511
10 Claims. (Cl. 260—33.2)

This invention relates to synthetic polyester resins and to the use of these compositions as electrical insulation, especially as a dielectric or insulation on electrical devices, e.g., capacitors, motors, generators, conductors, etc. More particularly, this invention relates to heat-curable polyester resins, the heat-cured products obtained therefrom, and to electrical insulation comprising the heat-cured products. The heat-curable compositions of this invention comprise a polymeric copolyester of (1) a pthalic acid comprising 50 to 100 mole percent isopthalic acid and 50 to 0 mole percent terephthalic acid, (2) a bis(hydroxyphenyl)alkane wherein the alkane group contains from 1 to 5 carbon atoms, and (3) a diphenolic acid in the amount of from 1 to 15 mole percent based on the total moles of bis(hydroxyphenyl)alkane and diphenolic acid.

Synthetic resins have been used for many years as electrical insulating materials in the form of molded products, laminated products, and as coatings on electrical conductors. Fibrous and fabric materials have been used in the form of tapes, sheets, etc., impregnated with various synthetic resins and used as such in the form of winding tapes which have been cured with heat after winding in place in the electrical device, or have been formed into laminated articles whereby a multiplicity of sheets have been laminated together under heat and pressure to produce a cured or thermoset product which is then used to isolate two or more electrical conductors from each other in the form of slot insulation, terminal blocks, etc., in electrical devices. The various synthetic resins have been used alone or in the form of enamels or varnishes to insulate electrical conductors by extruding or dip coating of the electrical conductor with the synthetic resin.

With the development of electrical apparatus which operates at higher temperatures than formerly, many of the synthetic resins previously used have proven unsatisfactory due to the inability to withstand the higher operating temperatures. Of the synthetic resins, only the thermosetting or curable resins have proven satisfactory in applications requiring continuous exposure above 100° C., because they do not flow at the high temperatures and therefore prevent the electrical conductors contacting each other, which would result in short-circuiting and failure of the electrical equipment. The power output of electrical devices, e.g., motors, generators, transformers, etc., of a given size can be increased by increasing the current density in the wires of such devices. The attendant rise in temperature due to higher current density increases the operating temperature of the equipment. The need for still higher temperature insulation has developed in order to meet the need for equipment capable of operating at these higher temperatures, e.g., up to at least 155° C. The need for insulation to withstand continuous operation at temperatures of at least 155° C. for coating metal wires, e.g., copper, aluminum, etc., to be used in such devices is extremely critical because such conductors must not only be able to withstand continuous exposure to the temperature, but must also withstand extremes of mechanical, electrical and thermal stresses. Thus, insulated wires to be employed as coil windings in electrical apparatus are generally assembled on automatic or semi-automatic coil winding machines which by their very nature, bend, twist, stretch and compress the insulated wire in their operation. After the coils are wound, it is common practice to coat them again with an enamel solution containing solvents such as ketones, alcohols, phenols, and substituted phenols, aliphatic and aromatic hydrocarbons, halogenated carbon compounds, etc. The initial insulation on the wire must be resistant to these solvents. In order to conserve space in electrical apparatus, it is essential that the individual turns which make up the coils be maintained in close proximity to each other. Because of the closeness of the turns and the fact that there may be large potential gradients between adjacent turns, it is necessary that the resins employed as wire insulation have a high dielectric strength do not flow and are thermally stable to prevent short-circuiting between adjacent coils. In addition to withstanding the high temperatures encountered in the operation of electrical apparatus, the electrical insulation must be able to withstand mechanical stresses and vibrations encountered in the operation of the devices.

In the past, many attempts have been made to prepare insulation and especially insulated conductors which will meet all the mechanical, chemical, electrical and thermal requirements of high temperature insulation, while still being economically feasible. Since in electrical equipment, for example, motors, generators, transformers, etc., the greatest amount of insulation is usually for the insulation of the wire and subsequent dipping of the wound coils and the wire makes up a preponderant amount of the bulk of the electrical equipment, the cost of the insulation on the electrical conductors is a very important factor in the total price of the electrical equipment. If the cost is too high, it will be impractical to use such insulated electrical conductors regardless of the properties of the insulation, except for extremely highly specialized applications. Another factor in the cost of the equipment is the cost of the solvent used to dissolve the resin to make the varnish. Since the solvents are not recovered, the resinous materials must be capable of being dissolved in low cost solvents.

Because of the properties required to make a commercially feasible, high temperature insulation, many well known resinous materials which have been satisfactory for lower temperature applications have proved unsatisfactory. The most satisfactory resins from a low cost standpoint as well as electrical properties have been the polyester type of resins based on a dibasic acid, and a dihydric alcohol having incorporated threin a polyfunctional material, e.g., either a polybasic acid having at least three carboxyl groups or a polyhydric alcohol having at least three hydroxl groups to render the resinous composition thermosetting. Unfortunately, the incorporation of these polyfunctional materials, e.g., a tricarboxylic acid or a trihydric alcohol in sufficient quantity to act as the sole cross-linking agent to give a cured product of satisfactory properties, etc., makes the resinous materials containing them very subject to gelation not only during preparation which limits the molecular weight which can be obtained during the preparation of the resin, but also during storage of the finished varnish before application and use. It therefore would be desirable to obtain a polyfunctional material which would act only as a difunctional material, i.e., only two reactable groups, during the preparation of the polyester but act as a tri- or higher functional material during the curing step.

In order to meet the high temperature requirements of the end use, it would be highly desirable to use a completely aromatic polyester, but unfortunately, the completely aromatic polyesters are only soluble in expensive solvents and usually only soluble if the solvent is kept at temperatures of 200° C. or higher, unless suitably modified with a coesterifiable ingredient to produce special copolyesters which remain soluble in the special solvents even at room temperature. Unexpectly, I have now discovered that certain phthalate esters of bis(hydroxphenyl)alkanes when coesterified with a diphenolic acid are very soluble at room temperature in common solvents and can be heat-cured to provide a thermoset insulation capable of continuous use at temperatures up to 155° C. and having all the other physical and electrical requirements of a Class F insulation. These compositions are phthalate polyesters of a bis(hydroxyphenyl)alkane wherein the alkane group contains from 1 to 5 carbon atoms and the phthalate radical of the polyester is from 50 to 100 mole percent isophthalate and from 50 to 0 mole percent terephthalate radicals coesterified with a diphenolic acid corresponding to the formula

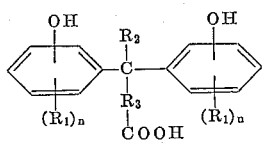

where $n$ is one of the integers 0, 1, 2, each $R_1$ is a lower alkyl radical, e.g., from 1 to 8 carbon atoms and preferably 1 to 4 carbon atoms, $R_2$ is an alkyl radical having any number of carbon atoms but preferably from 1–18 carbon atoms and generally, a lower alkyl radical, e.g., from 1–8 carbon atoms, $R_3$ is an alkylene radical containing at least two carbon atoms having any number of carbon atoms but preferably from 2–18 carbon atoms and generally a lower alkylene radical, e.g., from 2–8 carbon atoms, and the hydroxyl group is in the para position when $n$ is 0, in an amount of from 1 to 15 mole percent based on the total moles of bis(hydroxyphenyl) alkane and diphenolic acid. It is readily apparent that there are no $R_1$ substituents when $n$ is 0.

These polyesters are completely soluble at room temperature in concentrations up to 15 to 20 weight percent or more in such readily available solvents as commercially available cresols, mixtures of cresols, sold as cresylic acid, as well as mixtures of cresol or cresylic acid with biphenyl or diphenyl ether. The diphenolic acid apparently functions chiefly as a difunctional material, apparently through esterification of its two hydroxyl groups without causing gelation during the preparation of the polyester in solution before the required molecular weight is obtained. Yet when these polyesters are applied to a substrate and heated to temperatures of from 250° up to the decomposition temperature of the composition in the absence of solvent or with simultaneous evaporation of the solvent, the carboxyl group of the coesterified diphenolic acid acts as a cross-linking agent by reacting with free hydroxyl groups or their lower alkyl monocarboxylic esters present in the polyester, to render the polyester insoluble and infusible. Although as little as 0.1 percent of the diphenolic acid will cause some cross-linkings, I have found that it is desirable to use at least 1 mole percent based on the total moles of the bis(hydroxyphenyl)alkane and diphenolic acid to get a fully cross-linked, thermoset product. Concentrations of greater than 5 and up to 15 mole percent on the same basis have some tendency to gel if heated for extended periods of time at the reaction temperature so they cannot be reacted to as high a molecular weight product as the polyesters containing from 1 to 5 mole percent which produces the most flexible and stretchable material necessary for use as wire enamels. However, such products can be produced with molecular weights high enough for use as other types of insulation. Concentrations of diphenolic acid greater than 15 mole percent on the same basis cause polyester to be so subject to gelation during preparation that only low molecular weight products can be obtained which become brittle during curing and therefore much less suitable for electrical insulation. Therefore, for the best flexibility extensibility, and highest molecular weight products, such as required when the polyester is used for wire enamel, the amount of diphenolic used should be in the range of 1 to 5 mole percent based on the total moles of bis(hydroxyphenyl)alkane and diphenolic acid. The polyesters containing higher amounts of diphenolic acid up to 10 mole percent are suitable as varnishes for coating wire coils insulated with the resin containing the lower amount of diphenolic acid, as impregnants for making of laminated stock and winding tapes, whereby the polyester is used to impregnate fibrous and fabric materials, etc. Furthermore, electrical conductors which are of such large cross-section that they are rigid in nature and do not undergo extensive flexing and stretching in use may likewise be insulated with the polyester containing up to 15 mole percent of diphenolic acid.

Examples of the bis(hydroxyphenyl)alkanes, hereinafter referred to as bisphenols for brevity, which I may use in the preparation of the polyesters are the bisphenols having the formula

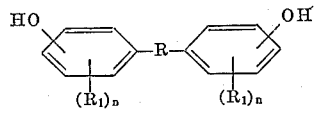

where $n$ is one of the integers 0, 1, 2, $R_1$ is as defined for the diphenolic acid component, R is a divalent saturated aliphatic group, i.e., alkylene or alkylidene radical having from 1 to 5 carbon atoms. These bisphenols may be described as bis(hydroxyphenyl)alkanes having from 0–2 lower alkyl substituents on the phenyl nucleus. Specific examples of radicals which R may be are methylene, ethylene, ethylidene, propylene, propylidene, isopropylidene, 1,4-butylene, 1,3-butylene, 2,3-butylene, 2-methylpropilidene, 2,2-butylidene, the pentylenes, e.g., 1,2-, 1,3-, 2,4-pentylenes, etc., the pentylidenes, e.g., 1,1-, 2,2-, 3,3-pentylidenes, etc., the isopentylidenes, e.g., diethylmethylene, methylpropylmethylene, etc. Since those bisphenols in which both hydroxyphenyl groups are on the same carbon atom of the alkane group are easiest to prepare and more readily avaliable, I prefer that R be an alkylidene group. The hydroxyl group may be in any of the positions ortho, meta or para with respect to R. However, those bisphenols with the OH groups in the meta positions are extremely difficult to prepare and those with the OH groups in the ortho positions are more difficult to prepare than those with the OH groups in the para position. Therefore, I prefer to use those bisphenols with the OH groups in the para position with respect to R, e.g., the bis(p-hydroxyphenyl)alkanes. Typical examples of bisphenols which I may use are the bis(hydroxyphenyl)methanes, i.e., bis(2-hydroxyphenyl)methane, bis(4-hydroxyphenyl)methane, 2-hydroxyphenyl-4-hydroxyphenylmethane, etc., 1,1-bis(hydroxyphenyl)ethanes, the 1,2-bis(hydroxyphenyl)ethanes, the 1,1-bis(hydroxyphenyl)propanes, the 2,2-bis(hydroxyphenyl)propanes, the 1,1-bis(hydroxyphenyl)butanes, the 1,2-bis(hydroxyphenyl)butanes, the 1,3-bis(hydroxyphenyl)butanes, the 1,4-bis(hydroxyphenyl)butanes, the 2,3-bis(hydroxyphenyl)butanes, the 2,2-bis(hydroxyphenyl)butanes, the 3,3-bis(hydroxyphenyl)-pentanes, etc., including those where the phenyl group has from 1 to 2 alkyl substituents having from 1 to 8 carbon atoms for example, 2,2-bis(2,6-dimethyl-4-hydroxyphenyl)propane,
2,2-bis(2,6-diethyl-4-hydroxyphenyl)propane,
2,2-bis(2,4-dioctyl-6-hydroxyphenyl)propane,
1-(2-methyl-4-hydroxyphenyl)-1-(4-ethyl-6-methyl-2-hydroxyphenyl)ethane,
1,2-bis(2-propyl-6-hexyl-4-hydroxyphenyl)ethane,
2,3-bis(2-t-butyl-4-hydroxyphenyl)pentane,
1,4-bis(4-isoamyl-2-hydroxyphenyl)butane, etc.

Because it is readily available at low cost, I prefer to use 2,2-(4-hydroxyphenyl)propane.

Typical examples of the diphenolic acids I may use are: those described, for example, in U.S. 2,933,520

Bader, which are prepared by the condensation of phenol, a cresol or a xylenol, with a keto acid. These diphenolic acids have the formula previously given. Since the reactive groups are the hydroxyl and carboxyl groups, there is nothing critical about the number of carbon atoms in the $R_1$, $R_2$ and $R_3$ groups. The number of carbon atoms in these groups is based solely on availability of the starting materials to produce the corresponding dephenolic acid. Preferably, $R_1$ has from 1 to 8 carbon atoms, e.g., methyl, ethyl, propyl, butyl, isobutyl, t-butyl, pentyl, hexyl, heptyl, octyl, etc. $R_2$ has preferably from 1 to 18 carbon atoms, e.g., those listed for $R_1$ and, in addition, decyl, dodecyl, tridecyl, hexadecyl, octadecyl, etc. $R_3$ is preferably the divalent radicals corresponding to monovalent radicals of $R_1$ except methyl, e.g., ethylene, the 1,2- and 1,3-propylenes, the 1,2-, 1,3-, 2,3- and 1,4-butylenes, the pentylenes, the hexylenes, the octylenes, the decylenes, the octadecylenes, etc. Typical examples of diphenolic acids I may use are 4,4-bis(4-hydroxyphenyl)-pentanioc acid, the 4,4- and 5,5-bis(4-hydroxyphenyl) hexanoic acids, the 4,4-, 5,5- and 6,6-bis(4-hydroxyphenyl)heptanoic acids, the 4,4-, 5,5-, 6,6-, and 77-bis(4-hydroxyphenyl)octanoic acids, the 4,4-, 5,5-, 6,6-, 7,7,- 8,8- and 9,9-bis(hydroxyphenyl)decanoic acids, 4,4-, 5,5-, 6,6-, 7,7-, 8,8-, 9,9-, 10,10-, 11,11-, 12,12-, 13,13-, 14,14-, 15,15-, 16,6- and 17,17-bis(4-hydroxyphenyl)octadecanoic acids,
4,4-bis(4-hydroxy-3-ethylphenyl)pentanoic acids,
4,4-bis(4-hydroxy-3,5-diisopropylphenyl)pentanoic acid,
4,4-bis(4-hydroxy-2-ethylphenyl)pentanoic acid,
4,4-bis(2-hydroxy-4-butylphenyl)pantanoic acid,
4,4-bis(4-hydroxy-2,5-diamylphenyl)pentanoic acid,
4,4-bis(4-hydroxy-3-methylphenyl)pentanoic acid,
4,4-bis(4-hydroxy-3-amylphenyl)pentanoic acid,
4-(4-hydroxyphenyl)-4(4-hydroxy-3-amylphenyl)pentanoic acid,
4-(4-hydroxyphenyl)-4-(2-hydroxy-3,5-dimethylphenyl) pentanioc acid,
4,4-bis(2-hydroxy-4-butylphenyl)pentanoic acid,
5,5-bis(4-hydroxy-2-methylphenyl)hexanoic acid,
5,5-bis(4-hydroxy-3-ethylphenyl)hexanoic acid, etc.

Because of its ease of preparation and because it is readily available, I prefer to use 4,4-bis(4-hydroxyphenyl)pentanoic acid.

The polyesters may be prepared using any material or mixture of materials from each of the three groups of components of the polyester resins of the present invention and any of the resulting resins are able to meet the physical, chemical, electrical and thermal properties which are required in insulation operable at temperatures of at least 155° C. for indefinite periods of time. However, I have found that the easiest way to make the polyesters of this invention is to use the bisphenol and diphenolic acid either in the form of their preformed, lower alkyl, monocarboxylic acid esters wherein the hydroxyl groups of both the bisphenol and the diphenolic acid are esterified, for example, the diacetate of the bisphenol and the diacetate of the diphenolic acid, or to form the ester in situ by the use of the anhydride of the lower alkyl, monocarboxylic acid in the presence of an inert solvent, preferably the same solvent which is to be used for forming of the polyester. The alkyl esters of the bisphenol and diphenolic acid are reacted with isophthalic acid which may contain up to 50 mole percent of terephthalic acid, based on the total weight, of isophthalic and terephthalic acids using as the solvent an inert organic liquid having a boiling point of from 210–280° C., preferably from 240°–260° C. Ideal solvents for this reaction are biphenyl, diphenyl-ether, naphthalene, and their halogenated or hydrogenated derivatives. Since the halogenated derivatives offer little advantage over biphenyl or diphenyl ether, I prefer to use the latter two as the solvent.

As will be readily apparent to those skilled in the art, it is highly desirable, in order to obtain the best polymer properties, that the finally cured and thermoset polyester be an essentially neutral polyester, i.e., contain essentially no unesterified hydroxyl or carboxyl groups, especially the latter. To obtain an essentially neutral polyester the proportions of the reactants are so chosen that for each carboxyl group present in the isophthalic, terephthalic and diphenolic acids there are from 1 to 1.05 hydroxyl groups present in the bisphenol and diphenolic acid. Any excess hydroxyl groups within these limits do not detract from the properties of the polymer since they will be present as the lower alkyl monocraboxylic acid ester of the starting material.

The reaction is carried out at a temperature sufficiently high that the polymer does not precipitate from the solution. Temperatures of from 210° C. up to the reflux temperature of the reaction mixture are advantageous. It is most convenient to use the reflux temperature. The heating is continued until no more of the lower alkyl monocarboxylic acid which is initially esterified with the bisphenol and diphenolic acid is expelled from the reaction mixture. Preferably, the reaction is carried out in an inert atmosphere, for example, an atmosphere of nitrogen, to exclude any oxidation of the resin while at this elevated temperature. After essentially all of the lower alkyl monocarboxylic acid is expelled, the reaction is continued until the desired viscosity of the resin is obtained, indicating that the desired degree of polymerization has been attained. In general, up to 90% of the lower alkyl carboxylic acid will have been expelled in about 1 to 4 hours, depending on the batch size. The reaction is continued for as much as an additional 20 hours to obtain a very high molecular weight polymer when the diphenolic content is from 1 to 5 mole percent. In general, the higher the molecular weight of the polymer, the more satisfactory it will be as an insulation for flexible conductors; so, if desired, longer heating periods may be used, but in general are not necessary. For the polyesters containing over 5 up to 15 mole percent diphenolic acid the viscosity increases faster than those compositions having the lower amount of diphenolic acid, so that their heating times can be reduced.

In general, I have found it very convenient to use enough solvent so that the resulting polyester solution at the end of the reaction is 60 weight percent in the solvent. Higher or lower amounts of solvent may be used, but I have found that this is the convenient proportion to use, since the resulting solution at the reaction temperature is not so viscous that decomposition will occur due to poor heat transfer. Furthermore, with this concentration of polyester, the biphenyl or diphenyl ether when used as the solvent does not have to be removed from the resin to use an insulating varnish or as an extrusion compound for extruding onto an electrical conductor. When biphenyl is used as the reaction solvent in the amount of 40% of the total weight of biphenyl and resin, a sample diluted to 10 percent resin solids with cresol will have a sufficiently high molecular weight for use as insulation on wire, when such a solution has a viscosity of at least 200 centistokes at 25° C., and preferably from 550 to 650 centistokes at 25° C. Higher concentrations of biphenyl in the solution appear to lower the viscosity. The polyester resin whose solution is in the range of 550–650 centistokes at 25° C. will have an intrinsic viscosity in the range of from 0.4 to 0.65.

When this desired viscosity is reached, the reaction mixture is permitted to cool to a temperature where the solution is still homogeneous, i.e., no polymer has precipitated, for example, in the range of from 140° up to the boiling point of the solvent which is to be added to give a final composition containing 15 to 20 percent resin solids. Suitable solvents are o-, m-, or p-cresol, mixtures of such cresols, e.g., the commercial mixture sold as cresylic acid, polar solvents, e.g., dimethylacetamide, benzonitrile, N-methyl pyrrolidone, etc. These solutions may also contain liquid hydrocarbons which themselves are not solvents for the polymer, as diluents for the solvent used. Because of their low cost, availability and high solvent power, I prefer to use the cresols or cresylic acid. Such an enamel is admirably suited for use as electrical insulation capable of withstanding continuous exposure to temperatures of at least 155° C. If a solid insulation is desired rather than an enamel, the solution without dilution with solvent can be cooled to room temperature to obtain a solid mixture of the polyester and biphenyl or diphenyl oxide which may be ground up and used as is for the extrusion of insulation on conductors, or it can be extracted with solvents, such as for example, benzene, toluene, acetone, etc., which are solvents for the biphenyl or diphenyl ether, but not for the polymer to remove all or part of the biphenyl or diphenyl ether. The isolated polymer may then be dissolved in a volatile solvent such as cresol alone or with solvents as dimethyl acetamide, N-methyl-2-pyrrolidone, benzonitrile, etc., and used for impregnation of fibrous materials, for the making of laminates, as wire insulation, etc. Non-solvent diluents may be added to the solutions, if desired.

As the amount of the terephthalic acid moiety of the polyester is increased up to 50 mole percent of the phthalate component, the uncured polyester becomes soluble in a wider variety of solvents. For a given diphenolic acid concentration in the polymer, this also shows up in decreasing the solvent resistance of the cured polymer. Although the cure dpolymer does not dissolve in the solvent, the solvent may soften and swell the resin. Therefore, for wire enamels I prefer to use those polyesters in which the phthalate component of the polyester is from 90 to 100 mole percent isophthalate and from 10 to 0 mole percent terephthalate. Those compositions containing a higher terephthalate content, i.e., from 10 to 50 mole percent, are desirable compositions to use as dipping or impregnating varnishes for impregnating coils wound from wire previously coated with the varnish containing the lower range of terephthalate moiety. This is especially true where the dipping varnish is dissolved in a solvent which is a non-solvent for the enamel used to coat the wire. To counterbalance the somewhat decreased solvent resistance of the higher terephthalate compositions, a higher concentration of the diphenolic acid component can be used.

In using the enamel to make an insulated electrical conductor, conventional techniques are used whereby the conductor is passed through the enamel and then through a die to coat the conductor with a film of the enamel which is then passed into a heated tower heated to a temperature in the range of 250° C. up to the decomposition temperature of the insulation, i.e., up to the highest temperature where no decomposition of the polymer occurs, sufficient to volatilize the solvents including the biphenyl or diphenyl ether and simultaneously cure the polyester to the insoluble, infusible state. Multiple passes can be used to produce a thicker coating. Likewise, if the solid polyester also containing biphenyl or diphenyl ether is used to extrude an insulating coating on a conductor, the conductor after it leaves the extruder is also passed into a heated tower to volatilze the biphenyl of diphenyl ether, and to cure the polyester resin on the surface of the conductor. Since the biphenyl or diphenyl ether acts as a volatilizable plasticizer for the polymer, I have found that 10–40% by weight of these materials is a useful range to have present in the polyesters used as an extrusion material.

I have determined that the above-described polyesters are capable of withstanding temperatures of at least 155° C. for an extended period of time. It is to be understood that the substrate on which the polyesters are applied also must be capable of withstanding this temperature. In other words, if the polyester is used to impregnate fibrous or fabric material the fibrous and fabric material must itself be capable of withstanding these temperatures and therefore is usually, but not necessarily, of an inorganic nature comprising inorganic fibrous materials such as asbestos or glass fibers which may be woven or matted into a sheet or fabric material. Also, when the polyesters are used to insulate an electrical conductor there is no interreaction between the insulation and the wire at this temperature, which would cause degradation of the insulation. However, when copper wire is insulated with my polyesters, I have noted that the copper catalyzes the curing of the polyester so that the heat-curing step does not need to be as long as when nickel-coated copper wire is used.

In addition to being able to withstand a temperature of at least 155° C., the insulation to be acceptable for commercial use must also be capable of withstanding a solvent test wherein the insulation is exposed to vapors of a refluxing solvent composed of equal volumes of toluene and ethanol denatured with 5-volume percent methanol, for a period of 5 minutes. During this test, the enamel should not blister or swell or show any visible change in the surface of the insulation. Another test which this insulation must pass is to not lose over 2 percent in weight based on the polymer when exposed to a temperature of 175° C. This test is usually conducted for a period of 192 hours, since any weight loss that would occur, occurs during this period. For the insulation of electrical conductors, the insulation should show no cut-through at 300° C. and preferably as high as 350° C. In conducting this test, the insulated electrical conductors are crossed at 90° and a given load applied and the temperature determined at which the load causes the two conductors to contact each other permitting electrical current to flow from one conductor to the other. Ordinarily this test is conducted using two round wires insulated with the insulation under test with the wires crossed at 90° and supporting a load of 1,000 grams at the intersection of the two wires. A potential of 110 volts A.C. is applied to the end of each wire and a circuit which contains a suitable indicator such as a buzzer or neon lamp is established between the ends of the wires. The temperature of the crossed wires and the load is then increased at the rate of 3° per minute until the enamel softens sufficiently so that the bare conductors come into contact with each other and cause the indicator to operate. The temperature at which this circuit is established is measured by a thermocouple extending into a thermal well at a point directly under the crossed wires. Although this measured temperature is always several degrees lower than the true temperature of the wires, it should be at least 300° C. in order for the insulation to be useful in rotating electrical equipment operating continuously or for extended periods of time at temperatures of at least 155° C.

In addition, if the insulation is to be used to insulate a flexible electrical conductor such as a wire, for example, in the making of insulated magnet wire, the insulation must be capable of withstanding the following tests. It must be capable of being stretched 25 percent and wound around a mandrel having a diameter twice the diameter of insulated wire and preferably on a mandrel having a diameter equal to the insulated wire without showing any surface defects, e.g., cracks, fissures or crazing, when inspected under a magnification of 10. It must be able to withstand heating at 175° C. for 100 hours and then wound around a mandrel having a diameter equal to that of the wire. Desirably, it can also be stretched as much as 15–25% before being wound on a mandrel whose diameter is twice, and preferably equal to, the diameter of the insulated wire. It must also be capable of being stretched 15 percent, wound on a mandrel having a diameter twice, and preferably equal to, the diameter of the insulated wire and then exposed to a temperature of 200° C. for one hour, without showing any of the above surface defects.

In addition to the above tests, the insulation must pass various tests such as dielectric strength, etc., but my experience has shown that for high temperature applications the above-listed tests are the most critical tests for differentiating and determining whether an insulation is suitable for continuous operation at 155° C. Polyester resins prepared from a mixture of ingredients having a composition range within the scope of this invention are completely satisfactory for use as insulation either on electrical conductors or in the form of impregnants for winding tapes and binders for laminated articles, etc., at temperatures of at least 155° C. for continuous operation. The suitability of this insulation for high temperature application is indicated by the fact that the insulation of this invention passes all the tests described above, as well as having suitable electrical properties, e.g., dielectric strength, etc. In addition, these polyester resins utilize relatively inexpensive raw materials, are soluble in inexpensive solvents, are curable at a rapid rate, for example, in a wire curing tower, and may be applied to various sizes, shapes, and compositions of conductors at a wide range of speeds and temperatures.

The following examples are illustrative of the practice of my invention and are given by way of illustration only, and not for purposes of limitation. All parts and percentages are by weight unless otherwise stated.

EXAMPLE 1

A mixture of 500 parts of acetic anhydride, 452 parts of 2,2-bis(4-hydroxyphenyl)propane and 5.7 parts of 4,4-bis(4-hydroxyphenyl)pentanoic acid was heated to the reflux temperature of the reaction mixture for a period of 90 minutes under a nitrogen blanket in a reaction vessel equipped with a stirrer, condenser, thermowell and nitrogen sparge tube. At the end of this time, the acetic acid and excess of acetic anhydride were distilled from the reaction mixture. Distillation was continued until the reaction mixture reached a temperature of 240° C., at which point the mixture was allowed to cool to ambient conditions. At this point in the reaction, the phenolic starting materials had both been converted to their corresponding diacetates. To this mixture, 331 parts of isophthalic acid and 181 parts of biphenyl were added. Over a period of 230 minutes, the reaction mixture was heated up to the reflux temperature of the reaction mixture while still maintaining the nitrogen atmosphere. Reflux conditions and the nitrogen atmosphere were maintained during the entire reaction period. Initially, the reflux temperature was 290° C. At the end of 355 minutes, the reflux temperature was 300° C., at which point 125 parts of additional biphenyl were added which lowered the reflux temperature to 275° C. A further addition of 170 parts of biphenyl was made after 115 minutes, after which the reaction was heated an additional 105 minutes at a reflux temperature of 260° C. The total reaction period was 805 minutes. The amount of biphenyl was 40% of the total weight of the biphenyl and resin. The acetic acid was allowed to distill from the reaction mixture as it was formed during the entire reaction. After cooling the reaction mixture to ambient temperature, the solid mass was broken into small lumps. The solid was heated at 140° C. with sufficient cresol to give an enamel solution containing 15% polymer solids. The solution was filtered through a coarse sintered glass funnel.

This enamel was used to produce an insulated coating on 40.3 mil copper wire. In producing the insulated wire, the wire was passed through the resin solution, drawn through a die, and then through a heated, 18-foot high tower, the hottest zone of which ranged from 375–415° C. After 6 passes through the enamel and tower, the insulated wire had a 2-mil build (one mil thick) insulated coating. The wire was passed through the oven at a speed of 21 feet per minute. When subjected to the above-described tests, the insulated electrical conductor satisfactorily passed all of these tests, and in some cases, exceeded the requirements of the test. It could be stretched 25% and wound around a mandrel having a diameter equal to the insulated wire. It could be stretched 15% and wound on a mandrel twice the diameter of the insulated wire, and heated for one hour at 200° C. After heating 100 hours at 185° C., it could still be wound on a mandrel having a diameter equal to that of the insulated wire. All these tests were performed without causing failure of the enamel. The insulated wire satisfactorily passed the solvent resistance tests, and had a cut-through temperature as high as 350° C.

Similar results are obtained when diphenyl ether is substituted for the biphenyl, when 4,4-bis(2-methyl-4-hydroxyphenyl)pentanoic acid is substituted for an equivalent amount of the 4,4-bis(4-hydroxyphenyl)pentanoic acid, and also when an equivalent amount of 2,2-bis(3-methyl-4-hydroxyphenyl)propane is substituted for the 2,2-bis(4-hydroxyphenyl)propane.

EXAMPLE 2

Using the type of reaction vessel described in Example 1, 779 parts of the preformed diacetate of 2,2-bis(4-hydroxyphenyl)propane, 9.3 parts of the preformed diacetate of 4,4-bis(4-hydroxyphenyl)pentanoic acid, 394 parts of isophthalic acid, 20.8 parts of terephthalic acid, and 227 parts of biphenyl were heated over a period of 420 minutes to a reflux temperature of 290° C. in a nitrogen atmosphere. After 105 minutes at this temperature, an additional 161 parts of biphenyl were added and the reaction continued for 355 minutes at a reflux temperature of 275° C., at which time an additional 213 parts of biphenyl were added to give a final concentration of 40% of the weight of biphenyl and resin. The reaction was continued for 955 minutes at a reflux temperature of 267° C. During the entire reaction period, the acetic acid distilled as it was formed by the ester interchange reaction. Heating was stopped after 1,835 minutes total time, and the reaction mixture allowed to cool to 200° C., at which point cresol warmed to 100° C. was added to give a solution containing 20% of the polyester resin. This solution was filtered through a coarse sintered glass funnel. A sample of this solution when diluted to 10% resin solids with cresol had a viscosity of 596 centistokes at 25° C. This enamel was used to insulate the same size copper wire using the same coating technique as described in Example 1, to produce insulated wire which again satisfactorily passed all of the tests previously described, and in many cases, exceeded the requirements of the test. The wire could be stretched 25% and wound around a mandrel having a diameter equal to the diameter of the insulated wire. It could be stretched 15% and wound around a mandrel equal to the diameter of the insulated wire and heated for one hour at 200° C. It could be stretched 25% and wound around a mandrel having a diameter equal to that of the insulated wire, after heating 100 hours at 175° C. All of these tests were performed without causing failure of the enamel. The insulated wire also satisfactorily passed the solvent resistance test and had a cut-through temperature as high as 325° C. The insulation build on the wire was 2.9 mils.

EXAMPLE 3

Example 2 was repeated starting with the same weight of initial reactants and biphenyl solvent. It took 480 minutes to heat the reaction mixture to the reflux temperature of 290° C., after 410 min. 374 parts of biphenyl were added and the reaction was continued for a total reaction time of 1,930 minutes, at which time an additional 301 parts of biphenyl were added, to give a final concentration of 50% of the total weight of biphenyl and resin. The reaction was terminated and cresol added to produce an enamel having 20% of polyester resin. During the reaction, samples of the reaction mixture has been taken. They were extracted with acetone to remove the biphenyl, vacuum dried at 120° C., and dissolved in cresol to give a 10% solution of the polyester resin. The viscosity of these solution was determined with the following results. At the end of 860 minutes, the viscosity was 208 centistokes; at the end of 1600 minutes, it was 704 centistokes; and at the end of 1930 minutes, it was 899 centistokes. By way of comparison, the solution of the enamel which was diluted with cresol to contain 10% by weight polyester solids, but containing the biphenyl, had a viscosity of 212 centistokes. Copper wire, which was insulated with this enamel as described in Example 1 but using a wire speed of 24 feet per minute, gave results identical with those obtained in Example 2, except the cut-through temperature was slightly lower, being 308° C. The insulation build on the wire was 2.7 mils.

EXAMPLE 4

Using the same type of equipment and procedure described in Example 1, a mixture of 750 parts acetic anhydride, 680 parts of 2,2-bis(4-hydroxyphenyl)propane, and 8.6 parts of 4,4-bis(4-hydroxyphenyl)pentanoic acid was heated at reflux for 90 minutes under a nitrogen blanket, after which the acetic acid and excess acetic anhydride was distilled until the temperature of the reaction mixture reached a temperature of 240° C., requiring 220 minutes. The reaction mixture was cooled to ambient conditions. To this reaction mixture, which was a mixture of the diacetates of the phenolic starting materials 447 parts of isophthalic acid and 49.6 parts of terephthalic acid and 267 parts of biphenyl were added. The reaction mixture was heated in a nitrogen atmosphere with stirring over a period of 340 minutes to a reflux temperature of 290° C. At the end of 100 minutes, an additional 196 parts of biphenyl were added, and the reaction continued at a reflux temperature of 272° C. for 70 minutes, at which time an additional 260 parts of biphenyl were added to give a concentration of 40% based on the total weight of biphenyl and polyester resin. The reaction was continued for 195 minutes at a reflux temperature of 265° C. for a total reaction time of 705 minutes. The reaction mixture was cooled to 200° C. and sufficient cresol heated to 100° C. was added to give an enamel containing 20% of the polyester resin. The solution was filtered through a coarse sintered glass funnel. This solution had a viscosity of 4,130 centistokes and when diluted with cresol to 10% polyester resin solids, had a viscosity of 306 centistokes. The enamel contained 20% resin solids, and was used to insulate copper wire as described in Example 1, except that in this case the temperature in the hottest part of the tower was in the range of from 425° C. to 460° C. and the wire speed was 24 feet per minute. This wire satisfactorily passed the tests previously described. The insulated wire could be stretched 25% and wound on a mandrel having a diameter twice the diameter of the insulated wire. It could be stretched to 15% and wound on a mandrel having a diameter equal to the diameter of the insulated wire, and heated for one hour at 200° C., and could be heated for 100 hours at 175° C., and wound on a mandrel having a diameter equal to the diameter of the insulated wire. All tests were performed without causing failure of the insulation. It also satisfactorily passed the solvent resistance test, and showed no cut-through when heated as high as 350° C. It therefore had a cut-through temperature exceeding 350° C. The insulation build on the wire was 2.8 mils.

EXAMPLE 5

Using the type of equipment described in Example 1, a mixture of 500 parts of acetic anhydride, 444 parts of 2,2-bis(4-hydroxyphenyl)propane, 17.2 parts of 4,4-bis(4-hydroxyphenyl)pentanoic acid, and 80 parts of biphenyl, were heated at the reflux temperature of the reaction mixture, for 90 minutes in a nitrogen atmosphere. At the end of this time, the acetic acid and excess acetic anhydride were distilled from the reaction mixture. Distillation was stopped at the end of 320 minutes, by which time the temperature had reached 240° C.

To this reaction mixture comprising the diacetates of the phenol starting materials dissolved in biphenyl, there was added 327 parts of isophthalic acid and an additional 101 parts of biphenyl. The reaction mixture was heated over a period of 370 minutes to a reflux temperature of 290° C. where the reaction was maintained for 130 minutes, after which 125 parts of biphenyl were added. The reaction was continued for 85 minutes at a reflux temperature of 275° C., when an additional 170 parts of biphenyl were added. The reaction was continued for an additional 130 minutes at a reflux temperature of 265° C., for a total reaction time of 715 minutes. The reaction mixture was allowed to cool to 140° C., at which time cresol was added sufficient to provide a solution containing 15% of the polyester resin and the solution filtered through a coarse sintered glass funnel. This resin solution was used to insulate wire as described in Example 1, using a speed of 18 feet per minute. The insulated wire satisfactorily passed the tests described above. The wire could be stretched to 25% and wound on a mandrel having a diameter twice the diameter of the insulated wire. It could be stretched to 15% and wound on a mandrel having a diameter twice that of the insulated wire, and heated for one hour at 200° C., and could also be heated for 100 hours at 175° C., and wound on a mandrel having a diameter equal to that of the insulated wire, all without failure of the insulation. The insulation also satisfactorily passed the solvent resistance tests, and had a cut-through temperature exceeding 350° C. build—1.9 mils.

When the amount of 4,4-bis(4-hydroxyphenyl)pentanoic acid was increased from 3% to 5% in the above polyester composition, the enamel so prepared was used to prepare hand dipped wires that also had satisfactory properties as a flexible insulation. The build was 1.3 mils.

Examples 1–4 have shown the effect of variation of percentage of terephthalic acid from 0–10 mole percent of the total iso- and terephthalic acid while maintaining constant the amount of bis(hydroxyphenyl)alkanoic acid, at 1 mole percent of the total moles of phenol reactants. Example 5 illustrates that by increasing the amount of bis(hydroxyphenyl)alkanoic acid to 3 and 5 mole percent of the total moles of phenol reactant, the polymer is more rigid, as the amount of the bis(hydroxyphenyl)alkanoic acid is increased, although satisfactorily passing the tests for the insulation of a flexible conductor. The enamels made with 1 mole percent of the bis(hydroxyphenyl) alkanoic acid give the more flexible insulation, and yet produce sufficient cross-linking that the insulation after curing is solvent-resistant.

The following example illustrates the preparation of compositions in which the bis(hydroxyphenyl)alkanoic acid is increased to 10 mole percent of the total phenolic reactants. This resin is more rigid and is not as satisfactory as those compositions containing the proportions of Examples 1–5 for insulation or flexible conductors, but is still quite flexible and satisfactory in all other properties, e.g., solvent resistance and cut-through temperature, and can be used for insulation of rigid conductors, or for the preparation of laminates, slot wedges, etc.

EXAMPLE 6

Using apparatus similar to that described in Example 1, 28.11 parts of the diacetate of 2,2-bis(4-hydroxyphenyl)propane, 3.70 parts of the diacetate of 4,4-bis(4-hydroxyphenyl)pentanoic acid, and 15.78 parts of isophthalic acid, and 23.73 parts of biphenyl, were heated in a nitrogen atmosphere with stirring to 260° C. in 45 minutes, at which time acetic acid began to distill from the reaction. Heating was continued for an additional 100 minutes, by which time 11.5 parts of acetic acid had been collected in the distillate receiver. The reaction mixture was allowed to cool to room temperature to form a light colored, opaque solid which could be easily broken up. This solid was dissolved in cresol to give a solution containing 10% by weight of polyester resin. The solution was used to hand-dip samples of copper wire using three dips with a cure for 3 minutes at 300° between each dip, build ca. 2 mils. The wire could be stretched 25% and wound on a mandrel having a diameter equal to the diameter of the insulated wire and had a cut-through as high as 390° C. The insulated wire when heated for 8 hours at 250° C. could be wound on a mandrel having a diameter 3 times the diameter of the insulated wire conductor. An insulated wire when wound on a mandrel having a diameter 3 times the diameter of the insulated wire could be heated for 1 hour at 250° C. These results which were obtained without failure of the insulation show that the insulation would be perfectly satisfactory for insulating rigid conductors which could be bent and shaped to form, without failure of the insulation, but are not quite flexible enough to be used for flexible wires. The hard resin containing the biphenyl can be extruded through a heated extruder onto such rigid conductors which are heated to volatilize the biphenyl. The cresol solution could also be used for impregnating inorganic substrates such as glass cloth, asbestos cloth, etc., and heated to drive off both the cresol and the biphenyl to produce tapes, sheets, and the like, useful for the formation of slot wedges, winding tapes, etc., for insulating motors, generators, and other electrical apparatus. The attached drawing shows a cross-section of a metal wire 1 insulated with a coating 2 of my polyester.

EXAMPLE 7

Polyesters were made similar to those shown in Example 1, but part of the isophthalic acid was replaced with 5, 10, 20 and 50 mole percent terephthalic acid. These compositions were extracted to remove the biphenyl. These compositions were all found to be soluble in cresol but only the polyesters containing 20 and 50 mole percent terephthalate moiety were soluble at concentrations of 15% polymer at room temperature in N-methyl-pyrrolidone. This demonstrates how the increase in the terephthalate moiety increases the solubility of the polymer in a wide variety of solvents.

Although the utility of the polyester resins of my invention have been described principally in terms of electrical applications, it should be understood that these resins may be used in all the other applications suitable for synthetic resins. Thus, these resins can be employed as insulation over wire previously coated with another polymer, or vice versa, to give a laminated, insulated coating on the wire to improve the properties of the insulation. Particularly interesting insulated wires have been made whereby the wire is first coated with polyimide resin and then coated with the polyesters of this invention to give an insulated coating having a cut-through temperature greater than 500° C. My polymers may also be used in protective coating applications by applying the resin in a suitable solvent, to a surface by brushing or spraying with subsequent curing. When used as protective coatings, these resins have outstanding resistance to weathering, and do not discolor after extended exposure at elevated temperatures. These resins can also be employed in varnish and paint formulations. These resins can also be used in molding powder formulations, by mixing them with various fillers such as wood flour, diatomaceous earth, carbons, silica, etc. These resins are also useful as impregnants and as bonding materials for metallic and fibrous laminates. As disclosed and claimed in the copending application of Arthur Katchman Serial No. 294,512, now U.S. Patent 3,259,816, filed simultaneously herewith and assigned to the same assignee as the present invention, these polyester resins are also suitable as the dielectric in the making of capacitors.

The polyester resins of the present invention may be mixed and cured with minor amounts of other resins such as melamine, formaldehyde resins, epoxide resins, such as the reaction products of ethylchlorohydrin, and bis(hydroxyphenyl)alkanes, phenol formaldehyde resins, aniline formaldehyde resins, urea formaldehyde resins, silicone resins, cellulose acetate resins, polyamide resins, vinyl resins, ethylene resins, styrene resins, butadiene-styrene resins, polycarbonate resins, polyimide resins, etc.

In the foregoing discussion and examples, various modifications have been disclosed. Obviously, other modifications and variations of the present invention are possible in the light of the above teachings. For example, various modifiers may be added which coesterify with the polyesters to modify the properties. Catalysts for accelerating both the esterification and/or curing step may also be added to the polyester compositions. It is therefore to be understood that changes may be made in the particular embodiments of the invention described which are within the full intended scope of the invention as defined by the appended claims.

What I claim as new and desire to secure by Letters Patent of the United States is:

1. A polymeric copolyester of (1) a phthalic acid comprising 50 to 100 mole percent isophthalic acid and 50 to 0 mole percent terephthalic acid, (2) a bis(hydroxyphenyl)alkane wherein the phenyl nucleus has from 0 to 2 lower alkyl substituents and the alkane group contains from 1 to 5 carbon atoms, and (3) a diphenolic acid in an amount of from 1 to 15 mole percent based on the total moles of bis(hydroxyphenyl)alkane and diphenolic acid, said diphenolic acid having the formula

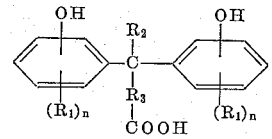

where $n$ is one of the integers 0, 1, 2, each $R_1$ is a lower alkyl radical, $R_2$ is an alkyl radical, $R_3$ is an alkylene radical containing at least two carbon atoms and the hydroxyl group is in the para position when $n$ is 0.

2. A polymeric copolyester of claim 1, wherein the diphenolic acid of (3) is 4,4-bis(4-hydroxyphenyl) pentanoic acid.

3. A polymeric copolyester of claim 1, wherein the amounts of the phthalic acids of (1) comprise 90 to 100 mole percent isophthalic acid and 10 to 0 mole percent terephthalic acid and the amount of the diphenolic acid of (3) is from 1 to 5 mole percent based on the total moles of bis(hydroxyphenyl)alkane and diphenolic acid.

4. A polymeric copolyester of claim 3, wherein the diphenolic acid is 4,4-bis(4-hydroxyphenyl)pentanoic acid.

5. A polymeric copolyester of claim 1, wherein the bis(hydroxyphenyl)alkane of (2) is 2,2-bis(4-hydroxyphenyl)propane and the diphenolic acid of (3) is 4,4-bis(4-hydroxyphenyl)pentanoic acid.

6. A polymeric copolyester of claim 1, wherein the amounts of the phthalic acids of (1) comprise 90 to 100 mole percent isophthalic acid and 10 to 0 mole percent terephthalic acid, the bis(hydroxyphenyl)alkane of (2) is 2,2-bis(4-hydroxyphenyl)propane, and the diphenolic acid of (3) is 4,4-bis(4,4-hydroxyphenyl)pentanoic acid in an amount of from 1 to 5 mole percent based on the total moles of 2,2-bis(4-hydroxyphenyl)propane and 4,4-bis(4-hydroxyphenyl)pentanoic acid.

7. An extrudable composition comprising from 10 to 40 percent by weight of a compound selected from the group consisting of biphenyl and diphenyl ether and from 90 to 60 percent by weight of a polymeric copolyester of claim 1.

8. A composition of matter comprising the heat-cured product of claim 1.

9. An insulated electrical conductor comprising an electrical conductor having on its surface a heat-cured composition comprising the polymeric copolyester of claim 1.

10. An insulated electrical conductor comprising an electrical conductor having on its surface a heat-cured composition comprising the polymeric copolyester of claim 6.

References Cited by the Examiner

UNITED STATES PATENTS

| | | | |
|---|---|---|---|
| 2,907,736 | 10/1959 | Greenlee | 260—47 XR |
| 2,917,414 | 12/1959 | McLean | 260—75 |
| 2,936,296 | 10/1960 | Precopio et al. | 260—75 |
| 3,036,990 | 5/1962 | Kantor et al. | 260—47 |
| 3,160,602 | 12/1964 | Kantor et al. | 260—47 |

FOREIGN PATENTS 863,704  3/1961  Great Britain.

OTHER REFERENCES

Monkhouse: Electrical Insulating Materials, published 1926, London, Sir Isaac Pitman & Sons Ltd., p. 53.

WILLIAM H. SHORT, *Primary Examiner.*

L. P. QUAST, *Assistant Examiner.*